Oct. 30, 1956 J. G. HOLBROOK ET AL 2,769,088

OSCILLATOR

Filed May 11, 1953

JAMES G. HOLBROOK
WILMONT L. HUNTER
*INVENTOR.*

*BY* [signature]

THEIR ATTORNEY 2,769,088
Patented Oct. 30, 1956

1

2,769,088

OSCILLATOR

James G. Holbrook, Hawthorne, and Wilmont L. Hunter, Los Angeles, Calif., assignors to Hoffman Electronics Corporation, a corporation of California Application May 11, 1953, Serial No. 354,314

1 Claim. (Cl. 250—36)

Figure 1:
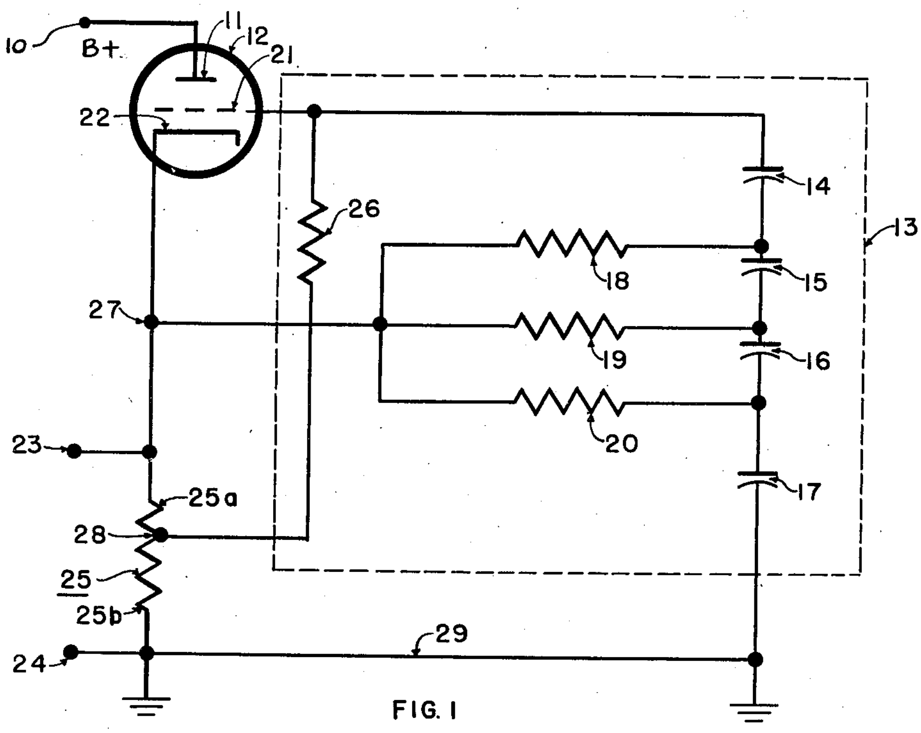

This invention relates to electronic apparatus, and more particularly, to improved circuits for oscillation generators.

In the past it has been generally considered impossible to construct a cathode-follower type of oscillator unless a voltage step-up transformer was utilized to effect a return to the grid of a vacuum tube a voltage higher than that appearing at the cathode of that vacuum tube. Therefore, it has been the custom, when wishing to build a resistance and condenser type of oscillator, to insert the network comprising these elements between the plate and the grid of the vacuum tube, the voltage gain of the vacuum tube being relied upon to provide sufficient feedback voltage so that oscillations would be sustained. The disadvantages of such an R-C oscillator are that the anode voltage for the vacuum tube appears in the output from the oscillator and direct coupling to a subsequent amplifier stage cannot be realized with any simplicity in the circuitry. Further, the feedback network operates considerably above ground or reference potential.

It is an object, therefore, of this invention to provide an improved R-C oscillator circuit.

It is the further object of this invention to provide an improved oscillator circuit in which the output signal may be connected directly to a subsequent amplifier stage.

It is a still further object of this invention to provide an improved R-C oscillator circuit in which the feedback network operates near ground or reference potential.

In accordance with this invention there is provided a cathode follower R-C oscillator in which the feedback network is connected between the cathode and the grid of the oscillator and produces a potential of sufficient magnitude and of the proper phase to produce sustained oscillations.

Figure 2:
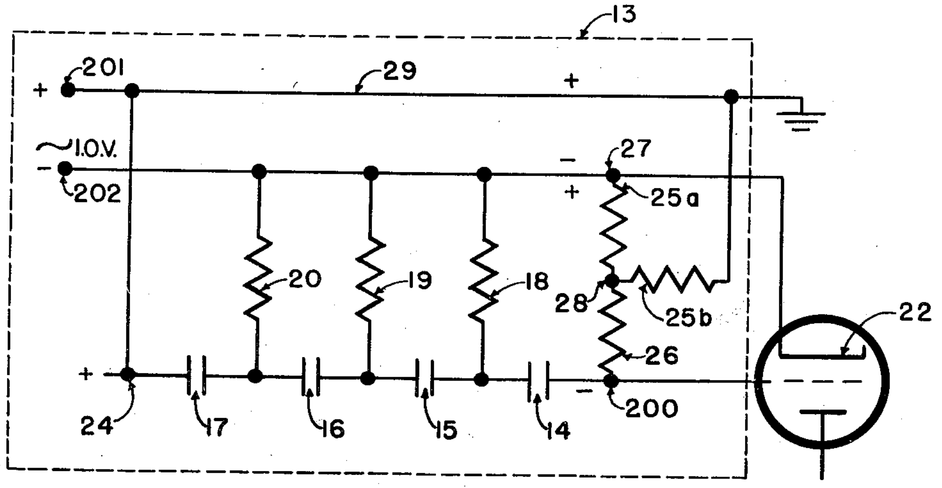

The features of the present invention which are believed to be novel are set forth with particularity in the appended claim. The invention, together with further objects and advantages thereof, may best be understood, however, by reference to the following description taken in connection with accompanying drawings, in which like reference numerals, indicate like elements, and in which:

Figure 1 is a schematic diagram showing an R-C oscillator according to the present invention; and, Figure 2 is a schematic diagram showing a portion of the circuit of Figure 1.

In Figure 1, positive voltage for operation of the oscillator is applied to terminal 10 and that voltage appears on anode 11 of electron-discharge device 12. Network 13 comprising condensers 14, 15, 16 and 17 and resistors 18, 19, 20 and 26 is connected between grid 21 and cathode 22 of electron discharge device 12. One terminal of condenser 17 is returned to ground or reference potential. Output signals from the circuit are obtained at terminals 23 and 24 which are connected across cathode resistor 25, one end of which is returned to ground or reference potential. Grid resistor 26 is connected between grid 21 of electron discharge device 12 and a tap 28 on cathode resistor 25.

2

The circuit of Figure 1 operates as follows: Assume, in order to excite oscillations in the circuit, a disturbance appears at grid 21 of electron discharge device 12. A corresponding disturbance of less magnitude will appear across cathode resistor 25. The magnitude reduction is a result of the fact that grid to cathode gain in an electron discharge device is always less than unity. This disturbance voltage appearing at cathode 22 is applied across network 13 by reason of the connection of terminal 27 of that network to cathode 22. Network 13 is designed to produce in one current component a phase shift of 180 degrees between its input and output terminals. This network has the characteristic of producing apparent voltage amplification, the exact mechanism of which will be explained in connection with Figure 2. As a result of this characteristic of network 13, there is applied to grid 21 a voltage equal to or slightly greater than the magnitude of the disturbance which originally occurred at that grid. Its phase must be such as to reinforce the original disturbance. That is accomplished in network 13. As a result of this feedback of a voltage of sufficient magnitude and of proper phase, sustained oscillations will occur at a frequency corresponding to that at which network 13 produces a phase shift of 180 degrees. Proper bias for grid 21 is obtained by returning grid resistor 26 to a tap on cathode resistor 25. Output voltages at the fundamental frequency of the oscillator may be obtained between terminals 23 and 24.

In Figure 2 network 13 is presented in a slightly redrawn form, but the connections remain the same as those shown in Figure 1. The magnitude of resistor 25A, which provides a small amount of bias to grid 21, is sufficiently small so that connection 28 may be considered as coinciding, electrically, with connection 27 which is at the potential of cathode 22. The magnitude of resistor 26 is very large with respect to the magnitude of 25B as will be shown in a tabulation of useable component magnitudes appearing hereinafter, so that there is very little voltage divider action across the combination of resistors 26 and 25B. Assume a varying potential having an envelope with an amplitude of one volt appears between cathode 22 and connector 29, the latter of which may be grounded. Assume, also, that this potential which appears between terminals 201 and 202 has an instantaneous polarity as shown in Figure 2. This potential will be impressed, also, between terminal 24 and terminal 202. The magnitudes of resistors 18, 19, 20, and 26 and associated capacitances 14, 15, 16, and 17 are such that there appears between connection 200 and connection 27 a potential shifted 180 degrees in phase with respect to the potential impressed between terminals 24 and 202. This alternating signal is also reduced in amplitude by reason of the power loss in the R-C network. The connections are such within this network that this signal shifted 180 degrees is combined with the original alternating potential appearing between terminals 201 and 202 in an additive fashion so that there appears between grid 21 and ground a potential greater than the original potential appearing between terminals 201 and 202 and hence, between cathode and ground. The amplitude of this resultant voltage may be 1.05 to 1.1 volts, for example. This increase in grid voltage results in a corresponding increase in cathode voltage, the increase being of sufficient amplitude to produce sustained oscillations in the circuit.

Purely by way of example, the constants of the circuit of Figure 1 may be as follows:

| | |
|---|---|
| Resistor **26** | 1.7 megohms. |
| Resistor **18** | 680,000 ohms. |
| Resistor **19** | 180,000 ohms. |
| Resistor **20** | 68,000 ohms. |

| | |
|---|---|
| Resistor 25 | 25,000 ohms. |
| Tap 28 | Down 680 ohms from top of resistor 25. |
| Condenser 14 | 300 micromicrofarads. |
| Condenser 15 | 900 micromicrofarads. |
| Condenser 16 | 2700 micromicrofarads. |
| Condenser 17 | 8200 micromicrofarads. |
| Electron discharge device | 12AU7. |
| Anode voltage | 150 volts |
| Output voltage | 70 volts peak to peak. |
| Frequency | 270 cycles per second. |

Although there has been shown and described an oscillator utilizing a vacuum tube and incorporating a phase shifting network, the same phase shifting network could be connected between the collector and base of a point contact or junction type of transistor and would produce corresponding sustained oscillations in such a transistor oscillator circuit.

Further, the position of capacitance and resistance elements in Figures 1, and 2 could be interchanged with appropriate modifications in their values and the circuit would operate. It is apparent that there has been provided an improved R-C oscillator circuit the output of which may be directly coupled to succeeding amplifier stages. Further, there has been provided an R-C oscillator in which the feedback network is operating near ground or reference potential.

While particular embodiments of the present invention have been shown and described, it is apparent that various changes and modifications may be made, and it is therefore contemplated in the appended claim to cover all such changes and modifications as fall within the true spirit and scope of the invention.

We claim:

An R-C oscillator circuit including a vacuum tube having anode, cathode and control electrodes, a bias resistor connected between said cathode electrode and reference potential, a passive voltage amplifying network coupled between said cathode and control electrodes, said network including a plurality of series connected capacitors, and a plurality of shunt connected resistors, all but the first of said plurality of resistors having one lead connected between successive capacitors and the remaining lead coupled to said reference potential, said first resistor having one lead connected to one terminal of the first of said plurality of capacitors, which terminal, in turn, is connected to said control electrode, the remaining lead of said first resistor being connected to a tap on said bias resistor, one terminal of the last of said capacitors being coupled to said reference potential, and a pair of output terminals connected across said bias resistor.

References Cited in the file of this patent

UNITED STATES PATENTS

| | | |
|---|---|---|
| 2,212,173 | Wheeler et al. | Aug. 20, 1940 |
| 2,586,803 | Fleming | Feb. 26, 1952 |

OTHER REFERENCES

Tele-Tech, April 1947, pp. 40, 41, 112.

Proc. I. R. E., vol. 39, July 1951, pp. 833–835.

Wireless Engineer, January 1953, pp. 10–19.

Wireless Engineer, January 1953, pp. 20–23.